United States Patent Office 2,763,745
Patented Sept. 18, 1956

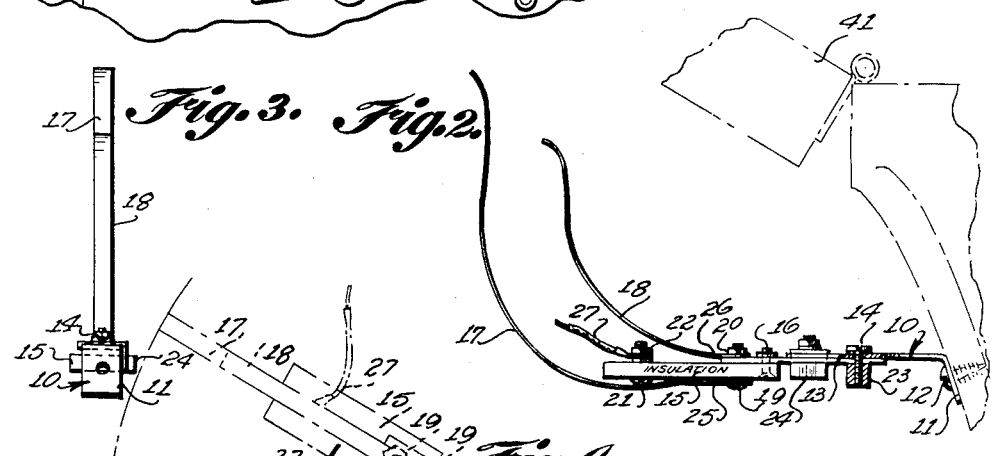

2,763,745

THEFT ALARM FOR AUTOMOBILES

Raleigh O. Watts, Washington, D. C.

Application June 1, 1953, Serial No. 358,775

2 Claims. (Cl. 200—61.62)

This invention relates to alarm or safety devices used in combination with motor vehicles, and in particular a switch, preferably mounted on the instrument panel or cowl in the forward part of a vehicle and extended into the interior of the vehicle whereby a spring finger extended therefrom is positioned to be engaged by a ventilator of a front door of the vehicle to close a circuit should the ventilator be opened inwardly or another spring finger also extended from the switch is adapted to close a circuit upon opening of a door of a vehicle, whereby a circuit would be completed to sound an alarm upon opening of the ventilator or door by an unauthorized person.

The purpose of this invention is to provide means for sounding an alarm upon opening, by unauthorized persons the ventilator of the front door of a motor vehicle or upon opening the door of the vehicle.

Various types of alarm devices have been provided for preventing theft of motor vehicles, however, with the conventional type of safety device wherein the circuit is broken to the ignition system it is possible to bridge the warning device or provide a bypass around an alarm circuit. With this thought in mind this invention contemplates an alarm device that operates independently to sound an alarm upon opening of a front door of a vehicle or upon opening of the glass ventilating panel of the door of the vehicle.

The object of this invention is, therefore, to provide means for incorporating a spring finger actuating contact switch in a motor vehicle whereby the switch is closed when an attempt is made to open one of the ventilators in the front doors of the vehicle or one of the front doors of the vehicle.

Another object of the invention is to provide a safety alarm for motor vehicles that is adapted to be installed in vehicles now in use.

A further object of the invention is to provide a safety alarm device to prevent theft of motor vehicles in which the device is of a simple and economical construction.

With these and other objects and advantages in view the invention embodies a bracket adapted to be attached to the inner surface of a motor vehicle with spring fingers extended from an insulating bar pivotally mounted on the bracket and with an alarm circuit connected through contacts on the insulating bar to the horn and battery of the vehicle.

Other features and advantages of the invention will appear from the following description taken in connection with the drawing, wherein;

Figure 1 is a side elevational view showing the interior of one side of a motor vehicle illustrating the method of mounting the alarm switch in the vehicle.

Figure 2 is a plan view of the alarm switch with parts broken away and shown in section and illustrating the switch as used on the left hand side of the vehicle facing the front with adjoining parts of the vehicle shown in broken lines.

Figure 3 is an end elevational view of the switch looking toward the end of the bracket upon which the flange is positioned.

Figure 4 is a side elevational view of the switch with the mounting bracket extended therefrom and showing the switch portion of the device extended upwardly in broken lines.

Figure 5 is a plan view similar to that shown in Fig. 2, also with part of the switch broken away and shown in section and illustrating the position of one of the contact fingers with the ventilator of the door of the vehicle partly open and showing the fingers bridging contacts of the circuit of the alarm.

Figure 6 is a diagrammatic view showing the alarm circuit.

Referring now to the drawing wherein like reference characters denote corresponding parts the safety or theft alarm device of this invention includes a bracket 10 having a flange 11 by which the device may be attached to a portion of a motor vehicle with a screw 12, an arm 13 pivotally mounted on the bracket 10 with a screw 14, a bar 15 of insulating material attached to the arm 13 with a bolt 16 and spring fingers 17 and 18 secured to the bar 15 and arm 13 with a contact screw 19 on which a nut 20 is threaded and the fingers 17 and 18 are positioned to engage a terminal formed with a screw 21 which is secured in the extended end of the bar 15 with a nut 22.

The screw 14 is provided with a thumb nut 23 to facilitate clamping the arm 13 and insulating bar in outwardly or upwardly extended positions and the extended end of the bracket 10 is provided with a flange 24 providing a stop limiting downward movement of the arm. The spring finger 17 is provided with a base section 25 that is positioned below the head of the screw 19 and the spring finger 18 is provided with a similar section 26 that is positioned below the nut 20. With the parts positioned in this manner both of the spring fingers are grounded to the vehicle body through the bracket 10. The terminal formed by the screw 21 in the extended end of the bar of insulating material 15 is connected by a wire 27 to a terminal 28 of a switch 29 and the opposite terminal 30 of the switch is connected by a wire 31 to a wire 32 that is connected to one terminal of a horn 33. The opposite terminal of the horn is connected by a wire 34 to a relay 35 and the relay is connected to one side of the battery 36 with a wire 37. The opposite side of the battery is connected to a ground 38. With the bracket 10 connected to a ground as indicated by the numeral 39 and with the switch 29 closed, opening of the glass panel 40 forming the ventilator of a front door of a motor vehicle moves the spring finger 18 from the position shown in broken lines in Fig. 5 to that shown in full lines wherein the spring finger contacts the end of the screw or terminal 21 whereby a circuit is completed to the horn.

It will also be noted that upon opening the door, which is indicated by the numeral 41, the spring finger 17 is released whereby it is moved by spring inherent therein until it contacts the head of the screw 21 whereby the circuit is completed to sound the horn.

It will be understood that the switch 29 may be positioned at any suitable point inside of a motor vehicle although it is preferred to mount the switch above the door on the side of the vehicle on which the driver's seat is positioned whereby upon leaving the car the driver will be inclined to close the switch.

With this switch open the horn is actuated by the horn button, as indicated by the numeral 42 in the conventional manner.

It will also be understood that the circuits from the switches at opposite sides of the vehicle body to the horn may be formed by other means.

The switch device is adapted to be used on both sides of a motor vehicle, as illustrated in Figs. 2, 5, and 6 and as the units are duplicates the same reference numerals are used for both. The stop 24 is provided on the lower side of the bracket of each device.

It will be understood that other modifications, within the scope of the appended claims, may be made in the design and arrangement of the parts without departing from the spirit of the invention.

What is claimed is:

1. A theft alarm for use on a motor vehicle having a door with a hinged ventilator panel therein comprising a bracket having a flange on one end for mounting the bracket on the inner surface of the motor vehicle, an arm having a bar of insulating material extended therefrom pivotally mounted on said bracket, a terminal extended through said bar of insulating material, spring fingers mounted on said arm, and positioned to, alternatively, engage the contact on the insulating bar whereby upon opening the ventilator panel one of said spring fingers engages the contact of the bar of insulating material and upon opening the door of the vehicle the other of said spring fingers engages the contact on the bar of insulating material.

2. In a theft alarm for use on motor vehicles, having a door with a hinged ventilator panel therein, the combination which comprises a bracket having a flange at one end for mounting the bracket on the inner surface of the vehicle, an arm having a bar of insulating material thereon pivotally mounted on said bracket, spaced spring fingers mounted on and extended from the arm, and a contact mounted on the bar of insulating material and thereby insulated from the arm and bracket, said contact being positioned to be engaged, alternately, by said spring fingers.

References Cited in the file of this patent

UNITED STATES PATENTS

| | | |
|---|---|---|
| 971,776 | Myers | Oct. 4, 1910 |
| 1,747,194 | Thomas | Feb. 18, 1930 |
| 1,878,920 | Waddell | Sept. 20, 1932 |
| 1,925,612 | Snell | Sept. 5, 1933 |
| 2,594,196 | Moledsky | Apr. 22, 1952 |
| 2,600,247 | Huetten | June 10, 1952 |
| 2,645,729 | Franke | July 14, 1953 |